United States Patent Office 3,677,696
Patented July 18, 1972

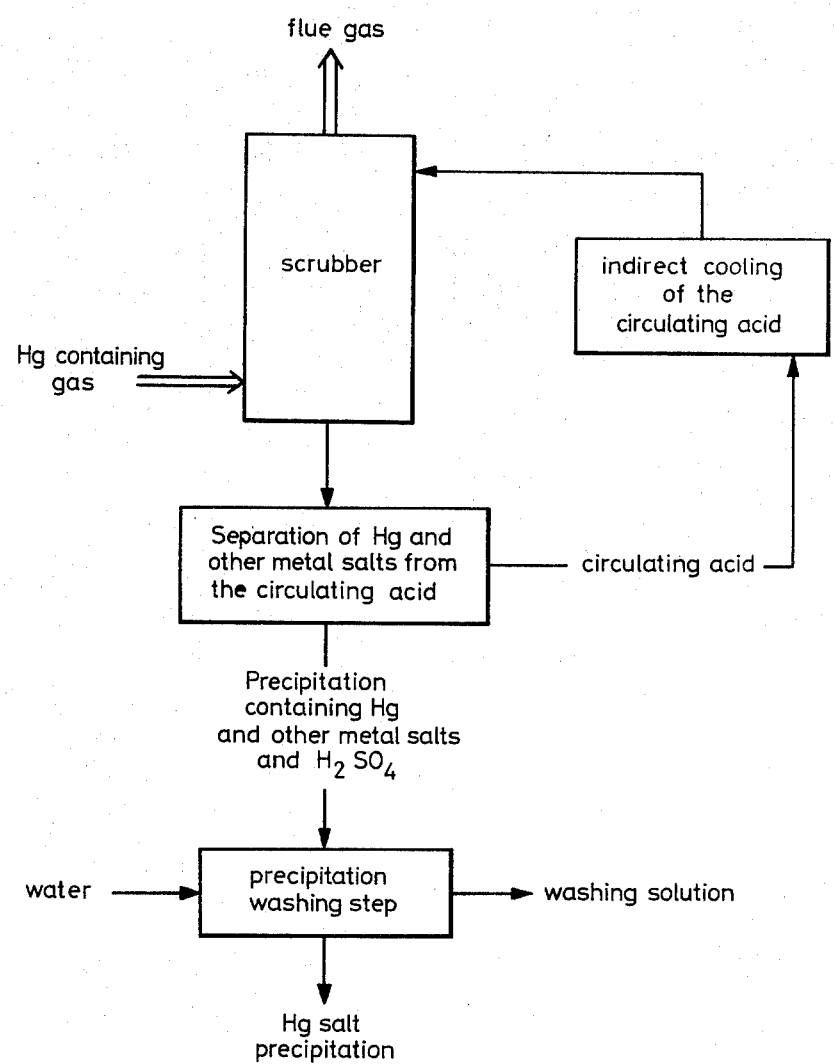

3,677,696
PROCESS FOR REMOVAL AND RECOVERY OF
MERCURY FROM GASES
Petri Bryk, Helsinki, Martti Haani, Kokkola, Jorma B.
Honkasalo, Westend, Jorma Kinnunen and Olle Lindsjo,
Pori, Erik Nyholm, Kokkola, Jaakko Poijarvi and Jussi
Rastas, Pori, and Juhani Kangas, Helsinki, Finland,
assignors to Outokumpu Oy, Outokumpu, Finland
Filed May 7, 1971, Ser. No. 141,239
Claims priority, application Finland, July 3, 1970, 1,901
Int. Cl. B01d 47/06
U.S. Cl. 23—2
2 Claims

ABSTRACT OF THE DISCLOSURE

The concentration of circulating sulphuric acid is adjusted to 80–98% by weight and used to wash hot gases containing mercury. The temperature of the acid is maintained between 70–250° C. and the solid material separating from the circulating wash solution is recovered.

BACKGROUND OF THE INVENTION

Field of the invention

The invention relates to the field of removal and recovery of mercury from gases.

Description of the prior art

This process for the removal and recovery of mercury relates, primarily, to ores or other raw materials in which mercury is present in minimal quantities or as a substance of secondary importance. In the thermal treatment of these ores or raw materials, the mercury compounds decompose and the mercury ends up in the gas phase created by the treatment. The mercury contained in the gases ends up in this case—depending on the further treatment of the gases—in either solid, liquid or gaseous intermediary or final products or residues. Lately, increasing attention has been paid to the possibility that mercury is carried by these products and residues to living nature and, through it, to the nutrition cycle. When amounts of mercury rise above certain standards that can be considered safe, they will be harmful to health. Mercury must be sufficiently prevented from being carried to living nature and nutrition cycle by such products and residues. For this purpose, for example, the treatment of mercury-containing raw-materials should be such that the mercury could be brought, as completely as possible and in a concentrated form, into some intermediary product of the process from which the recovery of mercury or its compound in a sufficiently pure form would be easy.

Part of the examples of a process according to this invention, which will be described below, has been applied to gases created in the oxidizing roasting of sulphide ores. Nevertheless, the process can be applied to the treatment of other types of mercury-containing gases as well. Normally, the mercury contents of most sulphide ores vary from a few p.p.m. to a few tens of p.p.m. and, of zinc and lead sulphide ores in particular, from a few tens of p.p.m. to a few hundred p.p.m. There are, also, raw materials which have considerably higher mercury contents and to which the described process can be applied.

During the thermal treatment of mercury-containing raw-materials, mercury compounds decompose and the mercury is carried to the gas phase. For example, in the roasting or smelting of sulphide concentrates—when the temperature is between 600 and 1500° C.—the HgS contained in the concentrate decomposes in the following manner:

(1)  $HgS(s) + O_2(g) \rightleftharpoons Hg(g) + SO_2(g)$

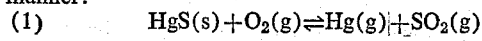

The mercury content of the respective gas phase of concentrates with a mercury content of 10–1000 p.p.m. is of the magnitude 5–500 mg./Nm.$^3$. The temperature in the dry gas treatment units after the actual roasting or other reactor is often still so high that the mercury is still in the form of vapor in the gas. For example, the temperature is often 300–350° C. after the normal cooling and dust separation units in the oxidizing roasting of certain sulphide concentrates. In this case, the mercury contained in the concentrate is almost completely in the gas phase, and the solid phases separated in the reactor, gas cooling, and dust separation units may, respectively, be almost free of mercury.

It is quite common to use the gases containing $SO_2$ obtained from the roasting or smelting of sulphide ores to produce sulphuric acid. In this case, after the dust separation carried out in dry electric precipitators, the gases go through a washing tower, often an indirect cooling unit, and a wet electric precipitator. Then they continue through a drying tower, heat exchangers, contact and cooling unit, and absorption tower. In the washing tower, the partly still dust-containing gases are washed, most usually by a 20–50% sulphuric acid solution circulating in the tower. During this phase the temperature of the gas sinks to 60–90° C. After an indirect cooling and a wet electric precipitation the temperature of the gas is usually 30–40° C. During these phases part of the mercury contained in the incoming gas remains in the washing precipitate; part of it continuing its way in an elemental form with the gas phase. In the drying and absorption tower, the gas comes into contact with strong sulphuric acid—in the former, about 95% by weight and in the latter, some 98% by weight. During these phases the mercury contained in the gas is dissolved into the sulphuric acid and is carried by it into products using the acid as raw material.

In the actual production of mercury, the most common raw material is a concentrate containing mercuric sulphide. This concentrate is treated thermally, often in an oxidizing atmosphere, in which case the decomposition of the sulphide takes place according to reaction (1). The temperature of the bed of solid material usually rises during this treatment to 600–700° C., and the mercury is removed with the gases. During the second phase of the production, the reaction gases containing mercury vapor are cooled to below 100° C. (10–30° C.), at which time mercury condenses. The residual gases after the condensation, which still contain several milligrams of mercury per one cubic meter (for example, at 10 and 20° C., the Hg contents of a gas saturated by mercury are, respectively, some 6 and 15 mg./Nm.$^3$) are, in some cases, cooled further before the gases are conducted to the flue.

The cooling of gas common in the production process for mercury described above could be thought to be used for the removal of mercury from other mercury-containing gases as well. However, the amounts of gas being great and the temperatures low, it would create a disproportionately large cooling system. For example, in the production of sulphuric acid, the cooling would be carried out after the washing tower, at which time the mercury content of the gas is regulated by the following reaction:

(2)  $Hg(g) \rightleftharpoons Hg(l)$

Bringing the Hg content of the gas low enough would presuppose a thorough cooling (for example, at $-10°$ C. the Hg content would still be some 1 mg./Nm.$^3$).

SUMMARY OF THE INVENTION

The above disadvantages can be eliminated by carrying out the treatment of mercury-containing gases according to this invention. In this case, the mercury can be separated from the gas in one phase, the separation is effective, and the mercury content in the separated product is high. If the gases contain selenium, it, also can be separated from the gas.

Mercury-containing gases, which have gone through the normal dry dust separation, are conducted to a special wash tower for gases where they are washed with a circulating sulphuric acid solution, the concentration of which is at least 80% by weight. The temperature of the circulating wash solution saturated with metal sulphates and other metal salts is regulated during the washing phase with the circulation rate and outside heat exchange so that the mercury contained in the incoming gas can be made to sulphatize and form mercuric compounds during the washing phase as completely as possible. At this time it is important that the wash solution is not diluted by the humidity contained in the gases. The concentration of the wash solution should be held constant, and the concentration and the washing temperature adjusted so that the mercury will be sulphatized or form mercuric compounds as completely as possible. The dilution of the wash solution can be prevented and the concentration of the wash solution held constant if the temperature during the washing of the gases is adjusted by the circulation of the wash solution and by outside heat exchange such that the water vapor pressure of the wash solution during the washing phase is the same as the partial pressure of the water vapor contained in the gas to be washed, the temperature generally being in the range of from 70° C. to 170° C.

If the circulating wash solution is saturated by mercuric and other metal salts (metals contained in the dust), the salts being particular to each system, there salts separate continuously from the circulating wash solution. The solid matter containing these salts is then separated from the wash solution with some suitable method. The separated precipitate is washed, in which case the sulphuric acid or other circulating solution and most of the other metal salts are dissolved in the washing solution and the mercury is left in the final precipitate. The precipitate may contain, also, other valuable elements, such as selenium. When the gases to be washed contain selenium, it, also, can be bound into the solid matter separating from the circulating wash solution and made to remain in the final precipitate after the washing of the solid material.

Mercury and selenium can then be separated into a pure form from the other elements contained in the final precipitate with some known production processes for mercury and selenium.

DESCRIPTION OF THE PREFERRED EMBODIMENTS

Example 1

In a laboratory experiment, mercury-containing gas, the carrier gas of which was air, was conducted through a normal laboratory washing bottle system. The washing system was immersed in an oil thermostat by which the desired temperature was maintained in the sulphuric acid solution that served as wash solution. The amount of sulphuric acid in the washing system was 200 ml. The gas was conducted into the washing system through a glass sinter.

When the concentration of the acid in the sulphuric acid system was 93% by weight and the temperature 150° C., the following figures were obtained:

Gas entering the washing system:

Rate of gas (air): 0.09 Nm.$^3$/h.
Hg° content: 31.7 mg./Nm.$^3$
H$_2$O content: 3.0 g./Nm.$^3$ Gas leaving the washing system:

Rate of gas: 0.09 Nm.$^3$/h.
Hg° content: <0.001 mg./Nm.$^3$
H$_2$O content: 3.0 g./Nm.$^3$

Example 2

With the process according to Example 1 and by regulating the acid concentration to 93% by weight and the temperature to 70° C., the following figures were obtained:

Gas entering the washing system:

Rate of gas: 0.09 Nm.$^3$/h.
Hg° content: 48.8 mg./Nm.$^3$
H$_2$O content: appr. 0 g./Nm.$^3$ Gas leaving the washing system:

Rate of gas: 0.09 Nm.$^3$/h.
Hg° content: 0.33 mg./Nm.$^3$
H$_2$O content: appr. 0 g./Nm.$^3$

Example 3

With the process according to Example 1, but by regulating the acid concentration to 85% by weight and the temperature to 150° C., the following figures were obtained:

Gas entering the washing system:

Rate of gas (air): 0.09 Nm.$^3$/h.
Hg° content: 29.0 mg./Nm.$^3$
H$_2$O content: 44.0 g./Nm.$^3$ Gas leaving the washing system:

Rate of gas (air): 0.09 Nm.$^3$/h.
Hg° content: 0.18 mg./Nm.$^3$
H$_2$O content: 44.0 g./Nm.$^3$

Example 4

With the process according to Example 1, but by regulating the acid concentration to 80% by weight and the temperature to 150° C., the following figures were obtained:

Gas entering the washing system:

Rate of gas (air): 0.09 Nm.$^3$/h.
Hg° content: 25.2 mg./Nm.$^3$
H$_2$O content: 100 g./Nm.$^3$ Gas leaving the washing system:

Rate of gas (air): 0.09 Nm.$^3$/h.
Hg° content: 0.41 mg./Nm.$^3$
H$_2$O content: 100 g./Nm.$^3$

Example 5

Gas created in the roasting of a zinc concentrate containing mercury had undergone a normal dry gas treatment system, the last phase of which had been dust separation in a dry electric precipitator. After this, the gas was treated according to the invention. In this case, the treatment was carried out according to the scheme shown in the drawing. After this treatment, the gas went through the normal sulphuric acid production unit.

Gas entering the washing tower:

Rate of gas: 52,000 Nm.$^3$/h.
SO$_2$ content of gas: 9% by volume
O$_2$ content: 6% by volume
Hg° content: 63 mg./Nm.$^3$
Rate of Hg: 3300 g./h.
Se content: 10 mg./Nm.$^3$
Dust content (Zn 50%, Fe 10%): 80 mg./Nm.$^3$
Rate of dust: 4200 g./h.
Temperature: 300° C.

Gas leaving the washing tower:

Rate of gas: 52,000 Nm.$^3$/h.
SO$_2$ content of gas: 9% by volume
Hg° content: <0.5 mg./Nm.$^3$
Temperature: 170° C.

The concentration of the sulphuric acid solution circulating in the washing tower was 89% by weight, the entering temperature being 40° C. and the washing and outgoing temperature 170° C.

The composition of the precipitate separated from the washing equipment was the following: Hg 8%, Se 1.3%, Zn 5%, Fe 1%, $SO_4$ about 80%.

The composition of the water-washed precipitate containing sulphate was the following: Hg 55%, Se 9%, Zn <0.05%, Fe <0.5%, $SO_4$ 16%.

The mercury content of the produced sulphuric acid was 0.5 p.p.m.

Example 6

With the process according to Example 5, the following results were obtained:

Gas entering the washing tower:

Rate of gas: 52,000 $Nm.^3/h.$
$SO_2$ content: 9% by volume
$O_2$ content: 6% by volume
$Hg°$ content: 120 mg./$Nm.^3$
$H_2O$ content: 11 g./$Nm.^3$
$SeO_2$ content: 35 mg./$Nm.^3$
Dust content (50% Zn, 10% Fe): 80 mg./$Nm.^3$
Rate of dust: 4200 g./h.
Temperature: 330° C.

Gas leaving the washing tower:

Rate of gas: 52,000 $Nm.^3/h.$
$SO_2$ content: 9% by volume
$Hg°$ content: 0.1 mg./$Nm.^3$
$H_2O$ content: 11 g./$Nm.^3$
$SeO_2$ content: 1 mg./$Nm.^3$
Temperature: 150° C.

The concentration of the sulphuric acid solution circulating in the washing tower was 90% by weight, the entering temperature being 40° C. and the washing and outgoing temperature 150° C.

Example 7

With the process described in Example 5, the following results were obtained:

Gas entering the washing tower:

Rate of gas: 52,000 $Nm.^3/h.$
$SO_2$ content: 9% by volume
$O_2$ content: 6% by volume
$Hg°$ content: 74 mg./$Nm.^3$
$H_2O$ content: 105 g./$Nm.^3$
Dust content (50% Zn, 10% Fe): 60 mg./$Nm.^3$
Rate of dust: 3150 g./h.
Temperature: 330° C.

Gas leaving the washing tower:

Rate of gas: 52,000 $Nm.^3/h.$
$SO_2$ content: 9% by volume
$Hg°$ content: 0.2 mg./$Nm.^3$
$H_2O$ content: 105 g./$Nm.^3$
Temperature: 170° C.

The concentration of the sulphuric acid solution in the washing tower was 85% by weight, the entering temperature being 40° C. and the washing and outgoing temperature 170° C.

Example 8

With the process according to Example 5, the following results were obtained:

Gas entering the washing tower:

Rate of gas: 52,000 $Nm.^3/h.$
$SO_2$ content: 9% by volume
$O_2$ content: 6% by volume
$Hg°$ content: 63 mg./$Nm.^3$
$H_2O$ content: 50 g./$Nm.^3$
$SeO_2$ content: 15 mg./$Nm.^3$
Dust content: 80 mg./$Nm.^3$
Rate of dust: 4200 g./h.
Temperature: 330° C.

Gas leaving the washing tower:

Rate of gas: 52,000 $Nm.^3/h.$
$SO_2$ content: 9% by volume
$Hg°$ content: 0.1 mg./$Nm.^3$
$H_2O$ content: 50 g./$Nm.^3$
$SeO_2$ content: <1 mg./$Nm.^3$
Temperature: 250° C.

The concentration of the sulphuric acid solution circulating in the washing tower was 96% by weight, the entering temperature being 40° and the washing and outgoing temperature 250° C.

The composition of the precipitate containing sulphuric acid and separated from the washing equipment was the following: Hg 8%, Se 1.3%, Zn 5%, Fe 1%, $SO_4$ about 80%.

The composition of the water-washed precipitate containing sulphate was the following: Hg 55%, Se 9%, Zn <0.05%, Fe <0.5%, $SO_4$ 16%.

The mercury content of the produced sulphuric acid was 0.2 p.p.m.

What is claimed is:

1. Improved process for the removal and recovery of at least one element from the group consisting of mercury and selenium from gases, in which the entering hot gases containing at least one element from the group consisting of mercury and selenium are washed with circulating sulphuric acid solution, wherein the improvement comprises adjusting the concentration of the circulating sulphuric acid solution to 80–93% by weight; maintaining the temperature of the acid solution between 70–250° C. in order to keep the concentration of the wash solution constant, while the water vapor pressure of the wash solution in the tower is the same as the partial pressure of the water vapor in the gas to be washed; separating and recovering solid material from the circulating wash solution.

2. Process of claim 1 in which a precipitate which contains mercury and other salts and which has been separated from the circulating solution is washed with water in order to concentrate the mercury and other valuable elements contained in the precipitate.

References Cited

UNITED STATES PATENTS

| | | | |
|---|---|---|---|
| 1,378,485 | 5/1921 | Rankin | 23—117 |
| 1,721,188 | 7/1929 | Reid et al. | 23—117 |
| 2,939,695 | 6/1960 | Gates | 75—81 |

CHARLES N. HART, Primary Examiner

U.S. Cl. X.R.

55—72; 75—81